US007859833B2

(12) United States Patent
Tanaka

(10) Patent No.: US 7,859,833 B2
(45) Date of Patent: Dec. 28, 2010

(54) FUNCTION EXPANSION DEVICE AND ELECTRONIC DEVICE SYSTEM

(75) Inventor: Kaigo Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 172 days.

(21) Appl. No.: 12/175,052

(22) Filed: Jul. 17, 2008

(65) Prior Publication Data

US 2009/0027849 A1 Jan. 29, 2009

(30) Foreign Application Priority Data

Jul. 23, 2007 (JP) ............................. 2007-191287

(51) Int. Cl.
G06F 1/16 (2006.01)
(52) U.S. Cl. ................................................ 361/679.41
(58) Field of Classification Search ............ 361/679.41, 361/679.45
See application file for complete search history.

(56) References Cited

U.S. PATENT DOCUMENTS

| 5,450,271 | A | * | 9/1995 | Fukushima et al. | ..... | 361/679.43 |
| 5,488,572 | A | * | 1/1996 | Belmont | ................ | 361/679.41 |
| 5,557,562 | A | * | 9/1996 | Yoshiharu et al. | ...... | 361/679.41 |
| 5,648,762 | A | * | 7/1997 | Ichimura et al. | ......... | 361/679.4 |
| 5,666,265 | A | * | 9/1997 | Lutz et al. | ............... | 361/679.55 |
| 5,692,400 | A | * | 12/1997 | Bliven et al. | ........... | 361/679.43 |
| 5,737,541 | A | * | 4/1998 | Shimizu et al. | ........ | 361/679.41 |
| 5,805,412 | A | * | 9/1998 | Yanagisawa et al. | ... | 361/679.41 |
| 5,948,074 | A | * | 9/1999 | Ninomiya | ............... | 361/679.41 |
| 6,072,695 | A | * | 6/2000 | Steiger et al. | .......... | 361/679.41 |
| 6,093,039 | A | * | 7/2000 | Lord | ...................... | 361/679.41 |
| 6,119,184 | A | * | 9/2000 | Takahama | ................ | 361/679.4 |
| 6,331,934 | B1 | * | 12/2001 | Helot et al. | ............ | 361/679.41 |
| 6,442,984 | B1 | * | 9/2002 | Katoh et al. | ........... | 361/679.41 |
| 6,522,533 | B1 | * | 2/2003 | Ikeuchi et al. | .......... | 361/679.43 |
| 6,741,462 | B2 | * | 5/2004 | Kamphuis et al. | ........ | 361/679.4 |
| 6,744,627 | B2 | * | 6/2004 | Won et al. | .............. | 361/679.41 |
| 6,757,166 | B2 | * | 6/2004 | DeLuga et al. | ......... | 361/679.41 |
| 6,885,552 | B2 | * | 4/2005 | Mullen et al. | .......... | 361/679.41 |
| 6,898,079 | B2 | * | 5/2005 | Park | ...................... | 361/679.43 |
| 7,027,297 | B1 | * | 4/2006 | Mizuno et al. | ......... | 361/679.07 |
| 7,158,377 | B2 | * | 1/2007 | Mecca et al. | ........... | 361/679.23 |
| 7,227,747 | B2 | * | 6/2007 | Walker et al. | .......... | 361/679.41 |
| 7,505,265 | B2 | * | 3/2009 | Nishiyama | ............. | 361/679.41 |
| 2004/0145864 | A1 | * | 7/2004 | Usui et al. | ............. | 361/679.41 |
| 2006/0232926 | A1 | * | 10/2006 | Homer et al. | .......... | 361/679.41 |

FOREIGN PATENT DOCUMENTS

JP 11-073242 3/1999

* cited by examiner

Primary Examiner—Lisa Lea-Edmonds
(74) Attorney, Agent, or Firm—Staas & Halsey LLP

(57) ABSTRACT

A function expansion device has a housing containing an electronic component and a locking mechanism having a lock-releasing member attached to the housing and movable between a locking position in which the member contacts the housing and a lock-releasing position to which the member moves in response to a lock-releasing operation. The locking mechanism locks an electronic device so that it cannot be removed when the lock-releasing member is in the locking position and unlocks the electronic device in response to an operation of moving the lock-releasing member from the locking position to the lock-releasing position. The housing and the lock-releasing member have respective holes which communicate with each other when the lock-releasing member is in the locking position.

18 Claims, 13 Drawing Sheets

FUNCTION EXPANSION DEVICE AND ELECTRONIC DEVICE SYSTEM

CROSS-REFERENCE TO RELATED APPLICATIONS

This application is based upon and claims the benefit of priority from the prior Japanese Patent Application No. 2007-191287 filed on Jul. 23, 2007, the entire contents of which are incorporated herein by reference.

BACKGROUND

1. Field

The present invention relates to a computer.

2. Description of the Related Art

A laptop personal computer has a connector to which a peripheral unit such as a printer is connected. In addition, an expansion purpose external hard disk or the like is also connected to a personal computer. A port replicator is widely used as a function expansion device for a personal computer. A function expansion device expands the function of a personal computer attached thereto. Recently, types of port replicators are increasing to which a personal computer is directly connected without a cable. A terminal (connector) protruding from the upper surface of the housing of such a port replicator is fitted into a connector provided in the bottom surface of the personal computer. By using a port replicator, the number of connectors, circuit boards and the like provided in a personal computer can be reduced. In this way, the port replicator can achieve both miniaturization and functionality of the personal computer. In addition, a port replicator can alleviate the troublesomeness of work for connecting a personal computer and a cable. A peripheral device and the port replicator are always connected and, for example when printing out data, the user may attach the personal computer to the port replicator, thereby connecting it indirectly to the peripheral device. The function expansion device is known not only as a port replicator but also as an expansion station or a docking station containing an optical disk drive, an expansion battery or the like, an external adapter which adds communication function to the personal computer, and so on.

By the way, with reduction in the size and weight of a unit, thefts of personal computers are increasing, and locking the personal computer for theft prevention is coming to be widely done. Recently, a wire cable lock such as the KENSINGTON lock is coming to be widely known which prevents theft by winding one end of the wire on a desk or the like and locking the electronic device with a locking member provided on the other end. A security slot for the wire cable lock is coming to be normally provided in a side surface of the housing of personal computers and port replicators. However, there is a problem that it is costly and troublesome to apply the wire cable lock to both the personal computer and port replicator for theft prevention thereof. Thus, the personal computer is locked to the port replicator so that it cannot be removed and the wire cable lock is applied to the port replicator.

A mechanism which locks an electronic device by engaging a hook protruding from the upper surface of the housing of a port replicator with a hole provided in the bottom surface of the electronic device is widely used in a method for locking a personal computer to the port replicator. This mechanism enables removal of the personal computer from the port replicator by rotating a lever interlocking with the hook to release the engagement of the hook.

Japanese Patent Laid-Open No. 11-073242 is known as a prior art. This prior art discloses a port replicator provided with a security slot near the rotational pivot of the lever. When the wire cable lock is applied to this port replicator, the rotational pivot of the lever is fixed to disable rotation of the lever. The port replicator is locked to the wire cable lock by applying the wire cable lock. Moreover, the personal computer mounted to the port replicator cannot be removed from the port replicator. Therefore, the personal computer is more reliably prevented from theft.

However, according to this prior art, it is conceivable that the user should forcibly rotate the lever, trying to remove the personal computer while being unaware that rotation of the lever is restrained by the wire cable lock or being absent-minded. In that case, the lever or the security slot may possibly be broken.

SUMMARY

According to an aspect of an embodiment, a function expansion device for expanding function of an electronic device attached thereto is provided, the function expansion device has a housing containing an electronic component; and a locking mechanism having a lock-releasing member attached to the housing so as to be movable between a locking position in which the member contacts the housing and a lock-releasing position to which the member moves in response to a lock-releasing operation, the locking mechanism locks the electronic device so that it cannot be removed when the lock-releasing member is in the locking position and unlocks the electronic device in response to an operation of moving the lock-releasing member from the locking position to the lock-releasing position. The housing and the lock-releasing member have respective holes which communicate with each other when the lock-releasing member is in the locking position, the holes operates as a security slot to which a locking member for locking the function expansion device for theft prevention is attached.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Hereafter, an embodiment of the present electronic device will be described with reference to the drawings.

Figure 1:
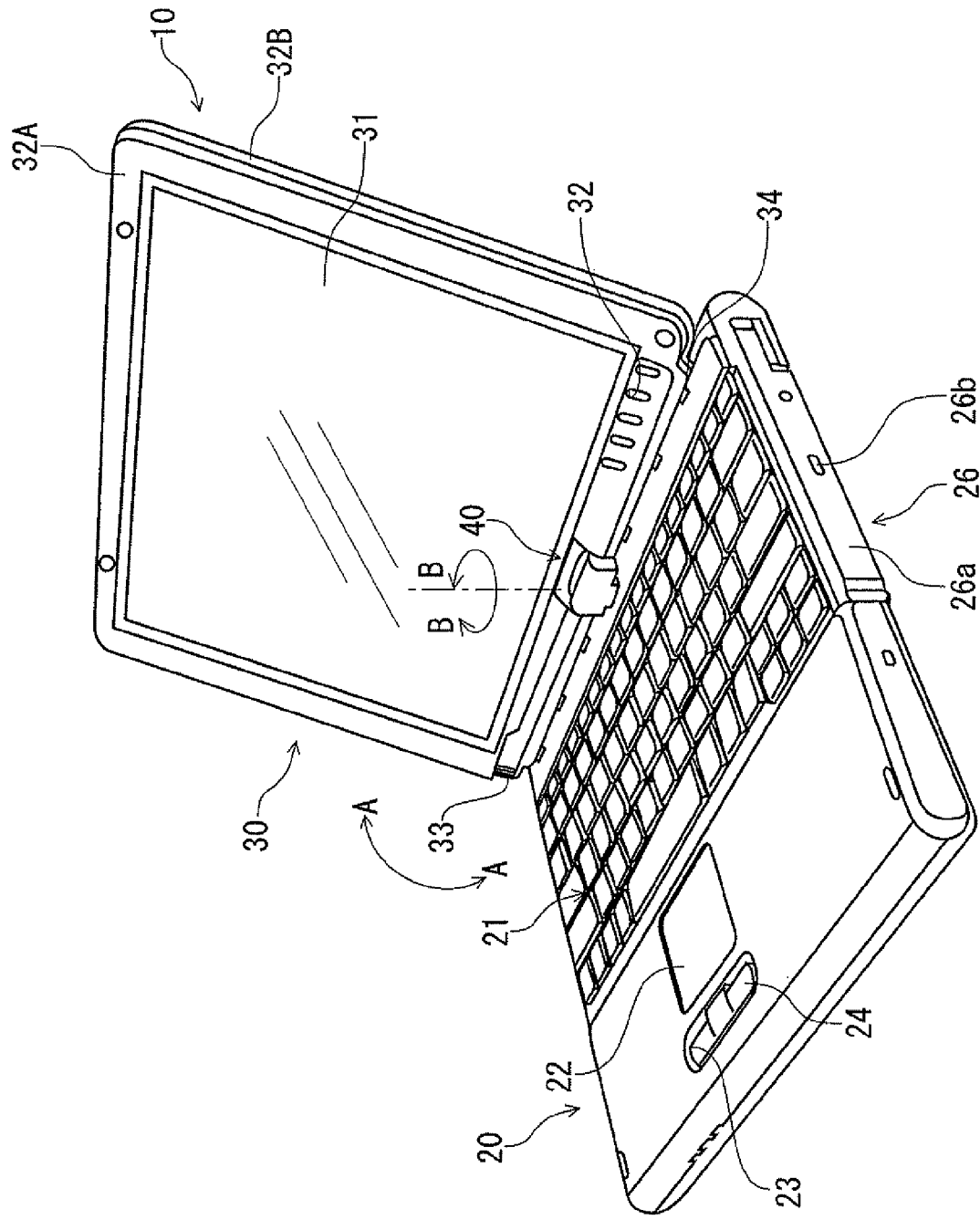
FIG. 1 is a perspective view of the appearance of a personal computer which is an embodiment of the present electronic device.

FIG. 1 is a perspective view of the appearance of a personal computer which is an embodiment of the present electronic device.

The personal computer 10 shown in FIG. 1 has as an input device an electromagnetic induction type digitizer mounted on the back side of a display screen 31, and detects the position on the display screen 31 indicated by a stylus. By such a configuration, the personal computer 10 enables input by indication. This input device may be a touch panel mounted on the display screen 31, instead of the digitizer and stylus.

The personal computer 10 has a main body unit 20 and a display unit 30. The display unit 30 is connected to the main body unit 20 by a biaxial connector unit 40 so as to be openable and closable in the direction of an arrow A-A and rotatable in the direction of an arrow B-B (about a rotational axis perpendicular to the main body unit 20) with respect to the main body unit 20. In the FIG. 1, the personal computer 10 is shown in a state in which the display unit 30 is opened with respect to the main body unit 20 (an open state). This open state corresponds to a first state of use.

The main body unit 20 has a keyboard 21, a track pad 22, a left click button 23 and a right click button 24. The main body unit 20 further has a display unit receiving member 34 which receives the display unit 30 from below. The display unit receiving member 34 corresponds to an example of a receiving member. The main body unit 20 also has on one side thereof an opening and closing cover 26a for an optical disk drive 26 in which an optical disk such as a CD or DVD is mounted to be driven and accessed. The opening and closing cover 26a has an eject button 26b which is pressed to open the opening and closing cover 26a.

The display unit 30 of the personal computer 10 has on the front surface thereof a display screen 31. The display unit 30 has several press buttons 32 in the right end below the display screen 31. The display unit 30 also has on the left end thereof a fingerprint sensor 33 which performs fingerprint authentication by being traced with a fingertip. In the display unit 30, the display screen 31 is sandwiched on the front and rear sides by a front casing 32A and a rear casing 32B, in the space defined by which casings is accommodated a later-described antenna for performing communication or the like. In the open state shown in FIG. 1, information is displayed on the display screen 31 with the direction of the rotational axis of the display unit 30 as the up-and-down direction.

Figure 2:
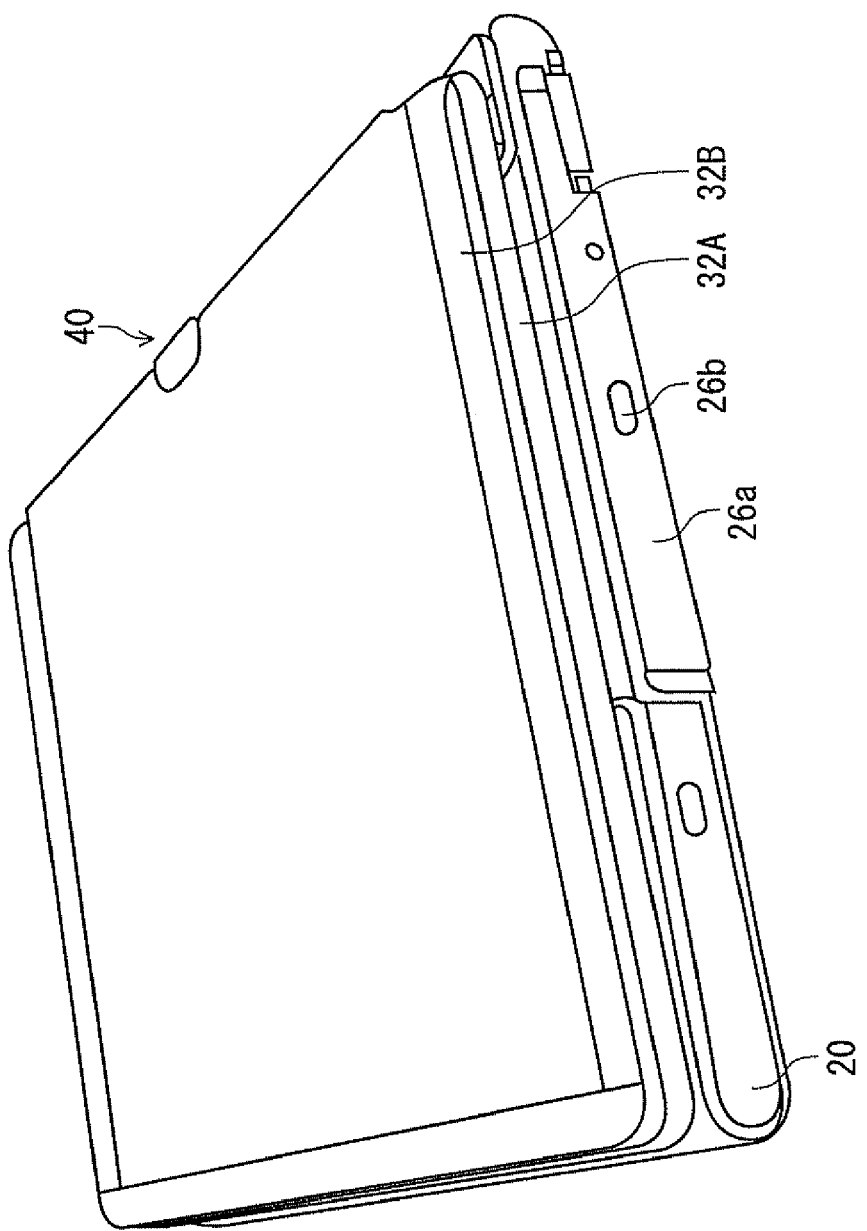
FIG. 2 is a perspective view showing the appearance of the personal computer with a display unit closed over a main body unit.

FIG. 2 is a perspective view showing the appearance of the personal computer with the display unit closed over the main body unit. In FIG. 2, the display unit 30 is in a state of being overlaid on the main body unit 20 with the display screen 31 (see FIG. 1) facing the main body unit 20. Hereafter, this state is referred to as a first closed state.

Upon closing the display unit 30 along the direction of the arrow A from the open state shown in FIG. 1, the personal computer 10 gets in the first closed state, where the display screen 31 is hidden inside and the back surface with respect to the display screen 31 is exposed outside, as shown in FIG. 2. The personal computer 10 in the first closed state can avoid staining or breakage of the display screen 31, providing portability.

Figure 3:
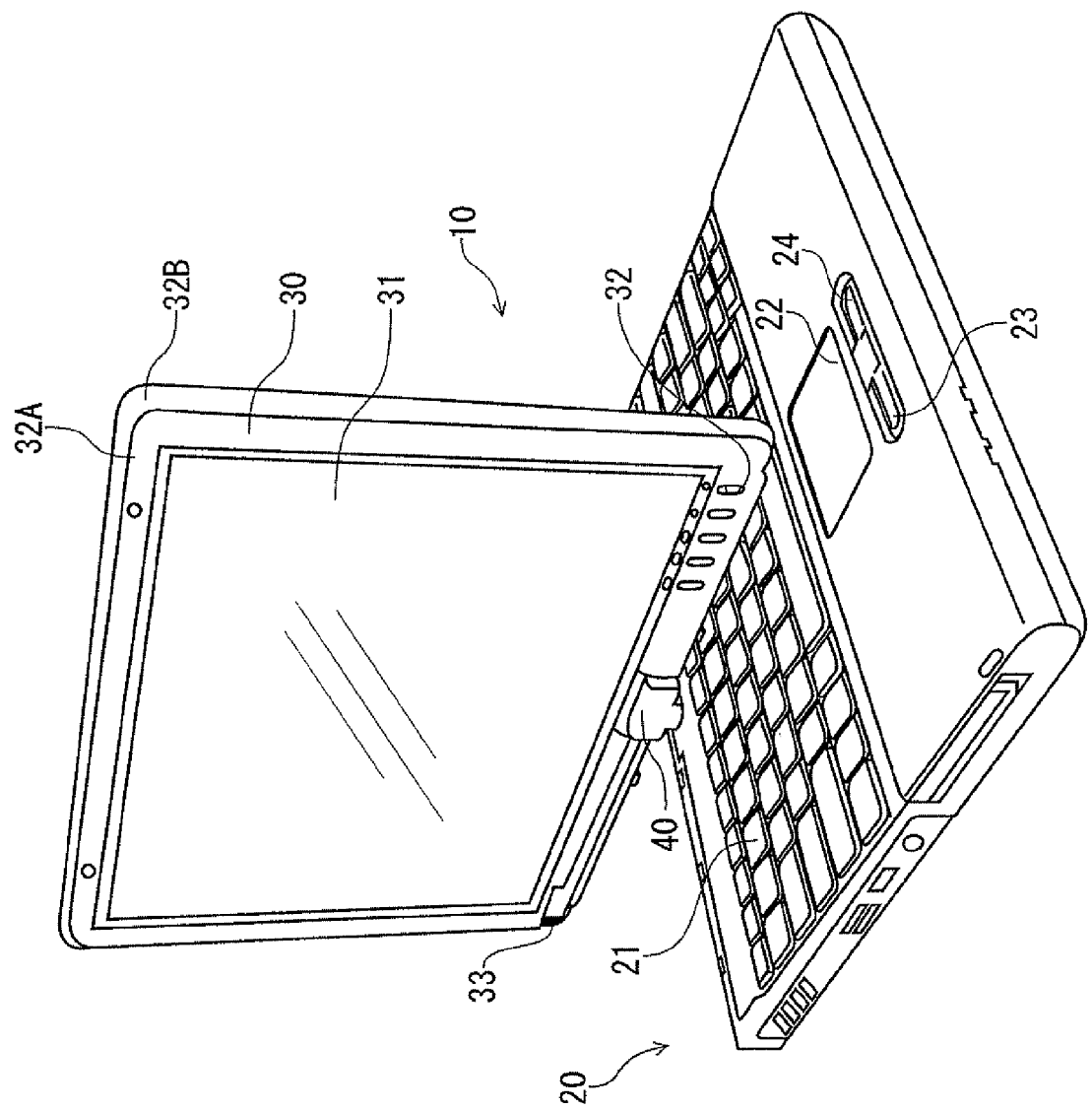
FIG. 3 is a perspective view showing the appearance of the personal computer with the display unit rotated substantially 90 degrees with respect to the main body unit.

FIG. 3 is a perspective view showing the appearance of the personal computer with the display unit rotated substantially 90 degrees with respect to the main body unit. The display unit 30 of the personal computer 10 can be rotated from the state shown in FIG. 1 via the state shown in FIG. 3 until the back side of the display screen 31 faces the front.

Figure 4:
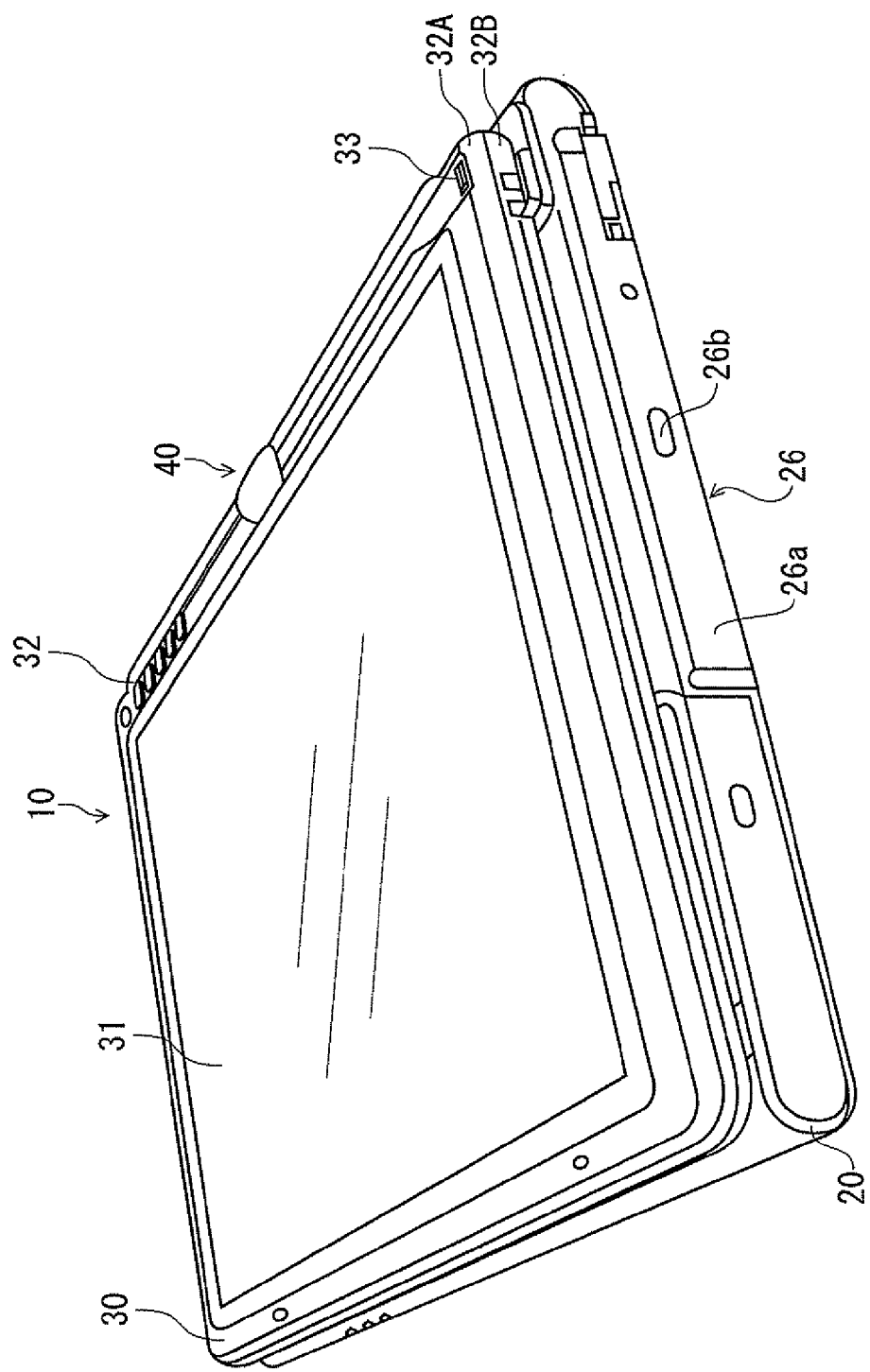
FIG. 4 is a perspective view showing the appearance of the personal computer, the display unit being overlaid on the main body unit with the display screen facing upward.

FIG. 4 is a perspective view showing the appearance of the personal computer, the display unit being overlaid on the main body unit with the display screen facing upward. The personal computer 10 gets in a second closed state shown in FIG. 4 when the display unit 30 is overlaid on the main body unit with the back surface thereof with respect to the display screen 31 facing the main body unit 20 after the display unit 30 has been rotated from the state shown in FIG. 1 via the state shown in FIG. 3 until the back side of the display screen 31 faces the front. Hereafter, "tablet mode" refers to an operation mode where the personal computer 10 is used in the second closed state.

As described above, the display screen 31 is a display screen with a pen input function, the display screen 31 having on the back side thereof an electromagnetic induction type digitizer for detecting the indicated position on the display screen. Usually, a user holds in one of his/her arms the personal computer 10 which is in the tablet mode, and operates the display screen with a stylus (not shown) in the other hand. In relation to the line of sight when holding in the arm the personal computer 10 which is in the tablet mode, the displayed image on the display screen 31 has the orientation thereof rotated 90 degrees from the open state shown in FIG. 1. That is, in the tablet mode, information is displayed on the display screen 31 with a direction perpendicular to the rotational axis of the display unit 30 as the up-and-down direction.

Next, the internal configuration of the personal computer 10 will be described.

Figure 5:
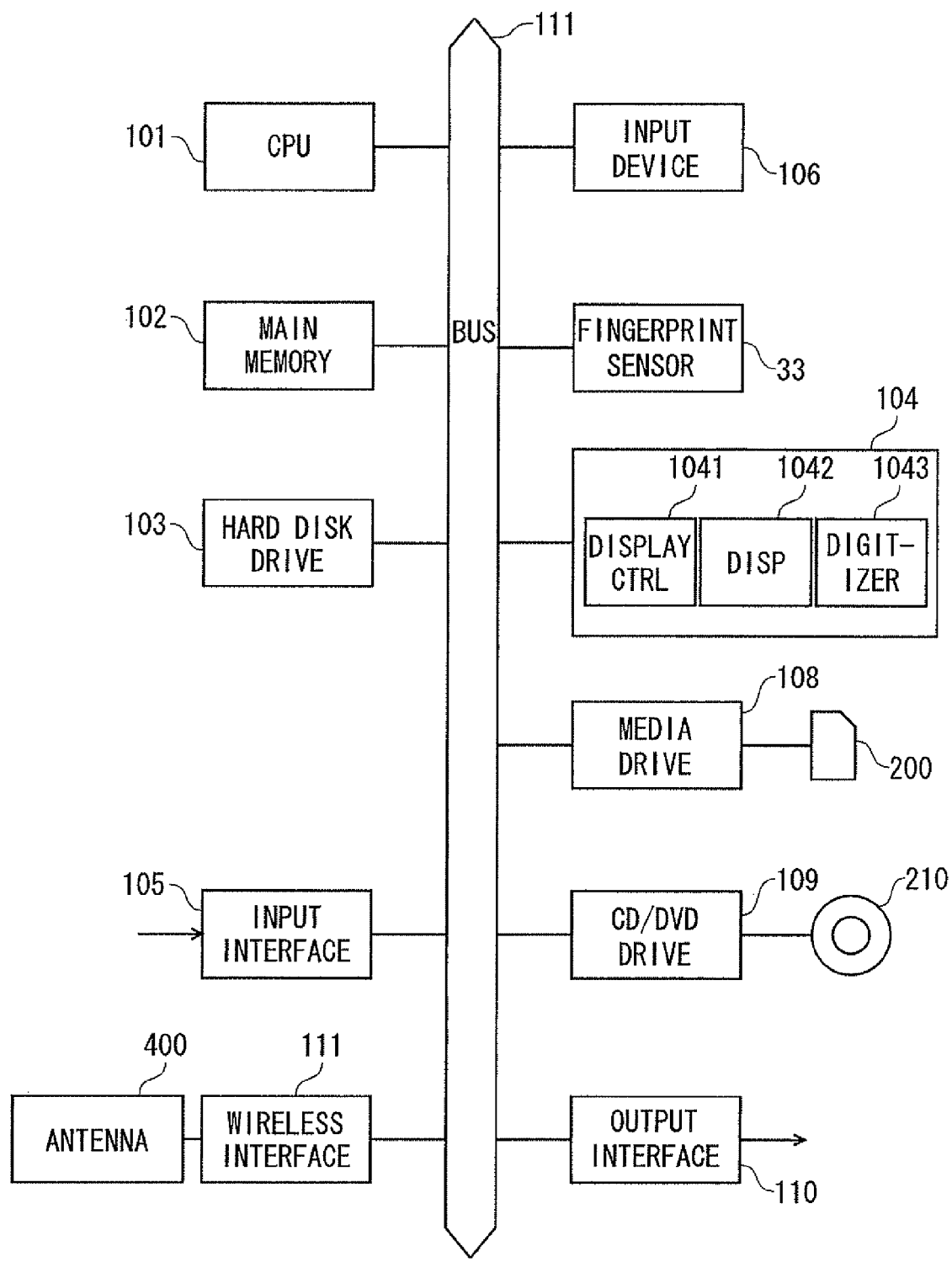
FIG. 5 is an internal configuration diagram of the personal computer.

FIG. 5 is an internal configuration diagram of the personal computer 10. As shown in FIG. 5, the personal computer 10 contains a CPU 101, a main memory 102, a hard disk drive 103, a display mechanism 104, a fingerprint sensor 33 shown in FIG. 1, an input device 106, a small recording media drive 108, a CD/DVD drive 109, an input interface 105, an output interface 110, an antenna 400, a wireless interface 111 and the like. These various elements contained are interconnected via bus 111. The CPU 101 executes various programs. In the main memory 102 are developed programs read from the hard disk drive 103 for execution by the CPU 101. The hard disk drive 103 stores various programs, data and the like. The display mechanism 104 conducts processes relating to displaying information. The input device 106 includes the keyboard 21, the track pad 22 and the like. The small recording media drive 108 accesses a small recording medium 200 loaded therein. The CD/DVD drive 109 accesses a CD-ROM 201 or DVD loaded therein. The input interface 105 inputs data from external devices. The output interface 110 outputs data to external devices. The antenna 400 transmits and receives radio waves. The wireless interface 111 performs wireless communication using the antenna 400. The display mechanism 104 is comprised of a display controller 1041, a display 1042 and a digitizer 1043. The display controller 1041 controls the direction and the like of information displayed on the display screen 31 shown in FIG. 1. The display 1042 displays information on the display screen 31. The digitizer 1043 is mounted on the back side of the display screen 31 and detects the position indicated by a stylus.

The personal computer 10 of the present embodiment has a connector for connecting with a peripheral device such as a printer and an expansion purpose external hard disk unit. A port replicator is prepared for expanding the function of the personal computer 10 attached thereto. In the following, explanation will be made in detail about a port replicator which is an embodiment of the present function expansion device.

Figure 6:
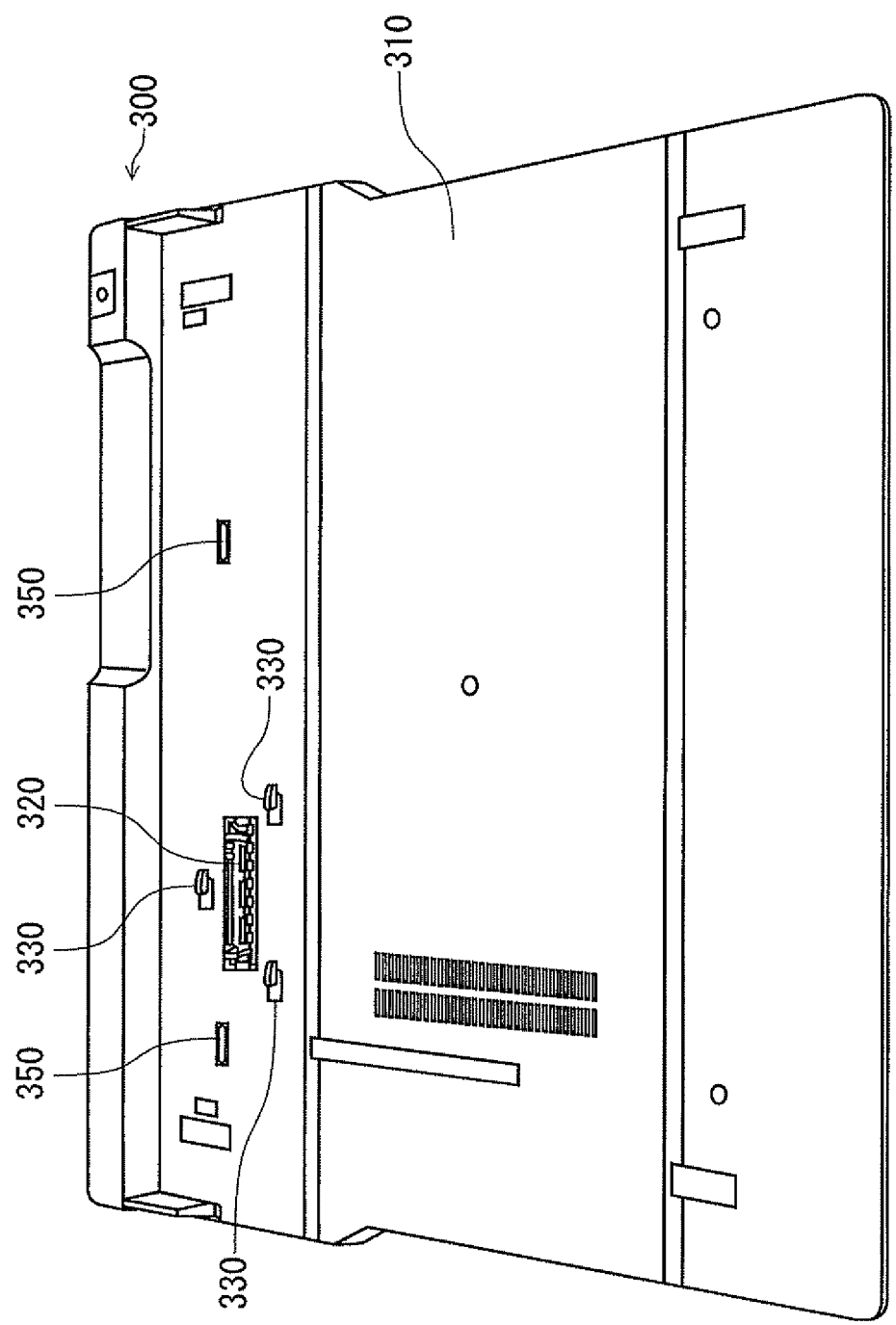
FIG. 6 is a view showing the appearance of a port replicator.

FIG. 6 is a view showing the appearance of a port replicator 300. The port replicator 300 has a putting (supporting or mounting) base 310. The personal computer 10 is attached to the port replicator 300 by being put on the putting base 310. Various processing circuit boards and hard disk units are contained in the putting base 310. Signal line connectors (not shown) are provided in a side surface and back surface of the putting base 310. The signal line connectors are fitted with terminals of signal lines for connecting with peripheral devices. A connector 320 is protruding from the upper surface of the putting base 310. The connector 320 mutually fits with a connector 11 (see FIG. 7) provided in the bottom surface of the personal computer 10. In addition, three locking hooks 330 protrude from the upper surface of the putting base 310. The locking hooks 330 engage with respective three holes 12 (see FIG. 7) provided in the bottom surface of the personal computer 10. In addition, the port replicator 300 also has a push-up member 350. The push-up member 350 protrudes from the upper surface of the putting base 310 and pushes up the personal computer 10 upward. FIG. 6 shows a state in which the push-up member 350 is accommodated in the putting base 310. The connector 320 of the port replicator 300 corresponds to an example of a connector of a function expansion device. The push-up member 350 corresponds to an example of an attachment-releasing member.

Figure 7:
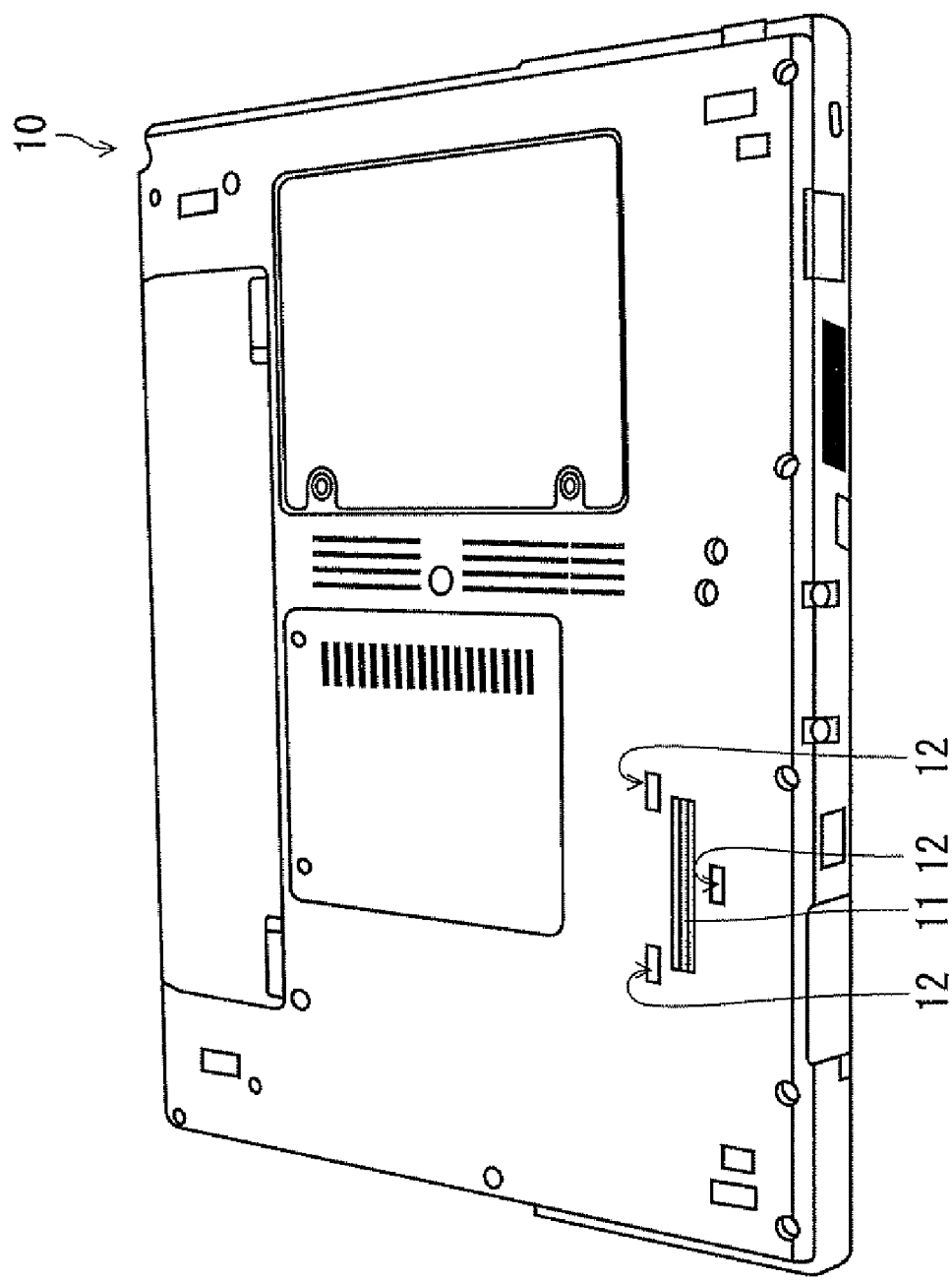
FIG. 7 is a view showing the bottom surface of a personal computer.

FIG. 7 is a view showing the bottom surface of the personal computer 10. In the bottom surface of the personal computer 10 is provided a connector 11 which fits with the connector 320 of the port replicator 300 shown in FIG. 6. Further, three holes 12 are provided in the bottom surface of the personal computer 10. The three locking hooks 330 of the port replicator 300 shown in FIG. 6 engage with respective holes 12. The connector 11 of the personal computer 10 corresponds to an example of a connector of an electronic device. The holes 12 correspond to an example of holes of a housing.

Figure 8:
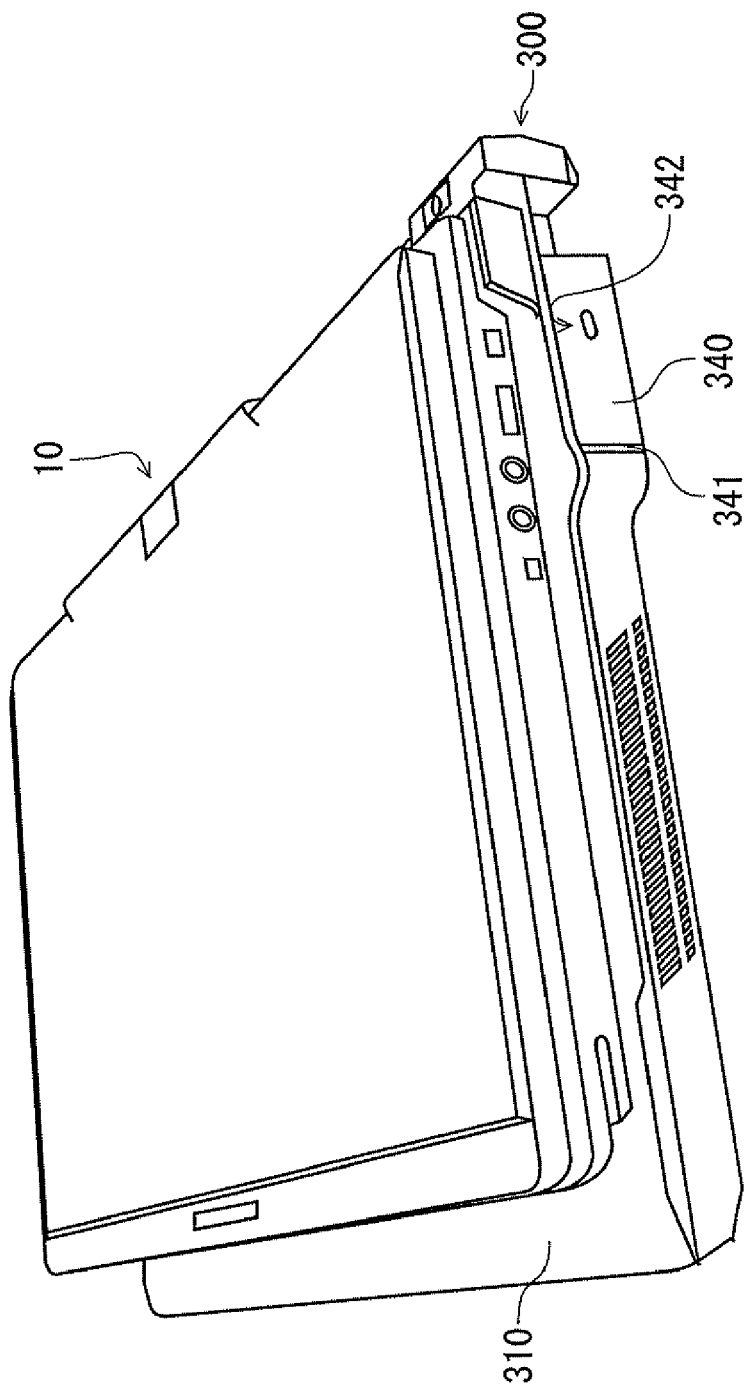
FIG. 8 is a view showing the port replicator to which the personal computer is attached.

FIG. 8 is a view showing the port replicator 300 to which the personal computer 10 is attached. When the personal computer 10 is put on the putting base 310 and pushed from above, the connector 11 of the personal computer 10 (see FIG. 7) fits with the connector 320 of the port replicator 300 (see FIG. 6). Further, the locking hooks 330 of the port replicator 300 (see FIG. 6) engage with the holes 12 of the personal computer 10 (see FIG. 7) and the personal computer 10 is attached to the port replicator 300.

A lever 340 is provided on a side surface of the port replicator 300, being attached so as to be rotatable with respect to the putting base 310 about a rotational pivot 341. This lever 340 interlocks with the locking hooks 330 and the push-up member 350 shown in FIG. 6. When the lever 340 is in the closed position with respect to the putting base 310 (hereafter, this position is referred to as locking position), the push-up member 350 is accommodated in the putting base 310 and the locking hooks 330 lock the personal computer 10. When the lever 340 is in the open position with respect to the putting base 310 (hereafter, this position is referred to as lock-releasing position), the push-up member 350 protrudes from the putting base 310 to push up the personal computer 10 and the locking of the personal computer 10 by the locking hooks 330 is released. The manner of locking and lock-releasing of the personal computer 10 will be described later in detail. The lever 340 corresponds to an example of a lock-releasing member.

In addition, the lever 340 has a lever side hole 342 near the end opposite the rotational pivot 341. The lever side hole 342 corresponds to an example of a hole of a locking member.

Figure 9:
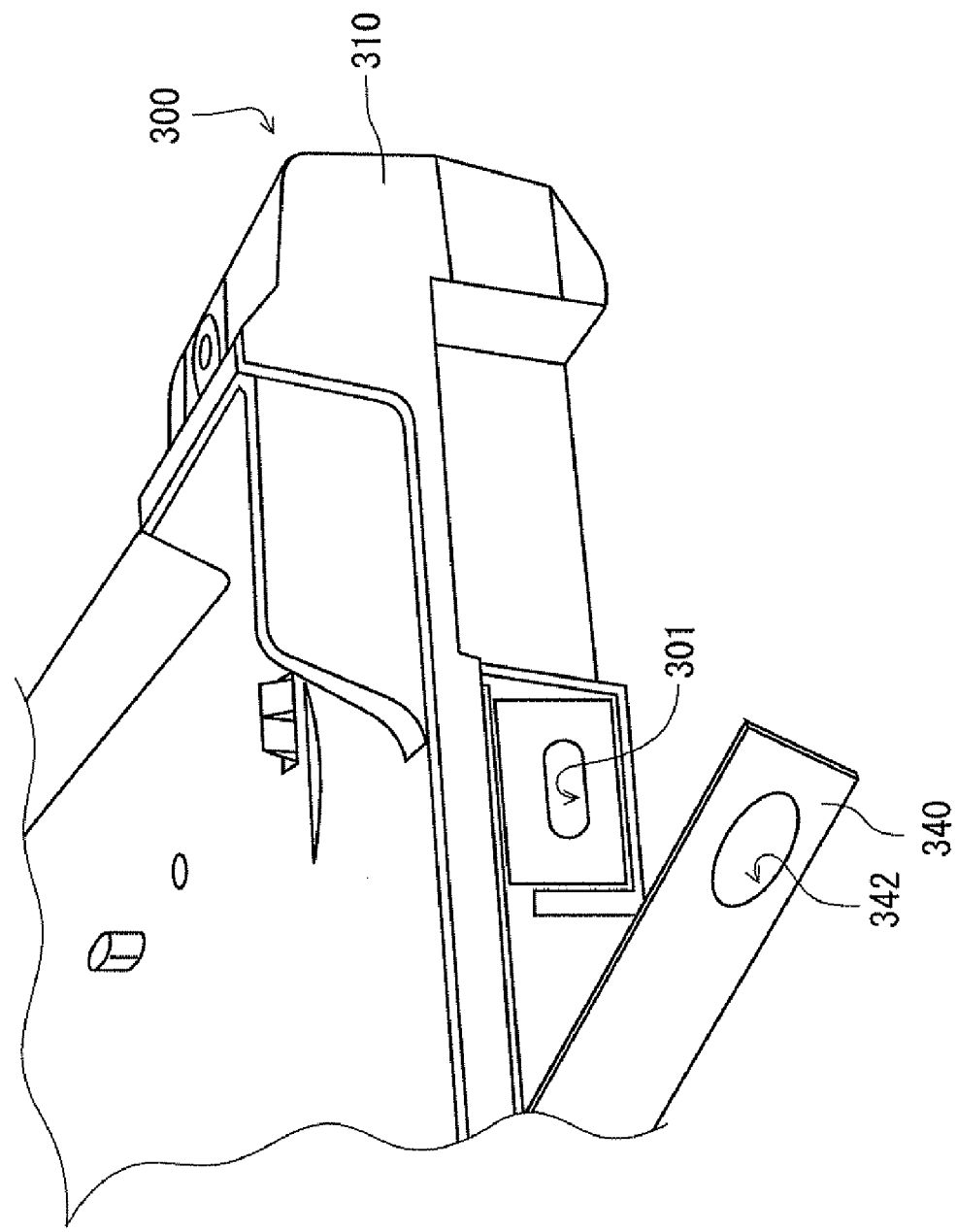
FIG. 9 is a view showing the port replicator with a lever opening with respect to a putting base.

FIG. 9 is a view showing the port replicator with the lever 340 opening with respect to the putting base 310. This FIG. 9 shows the port replicator with the lever 340 in the lock-releasing position. As shown in FIG. 9, the putting base 310 has a putting base side hole 301 in the position facing the lever side hole 342 of the lever 340. The putting base side hole 301 corresponds to an example of a hole of a housing.

The putting base side hole 301 and the lever side hole 342 intercommunicate (align) when the lever 340 is in the locking position shown in FIG. 8. Thus, the putting base side hole 301 and the lever side hole 342 work as a security slot to which the later-described wire cable lock is attached.

The port replicator 300, in its appearance, is configured as described above.

Next, the manner of locking of the personal computer 10 and the manner of lock-releasing of the personal computer 10 by the lever 340 will be described.

Figure 10:
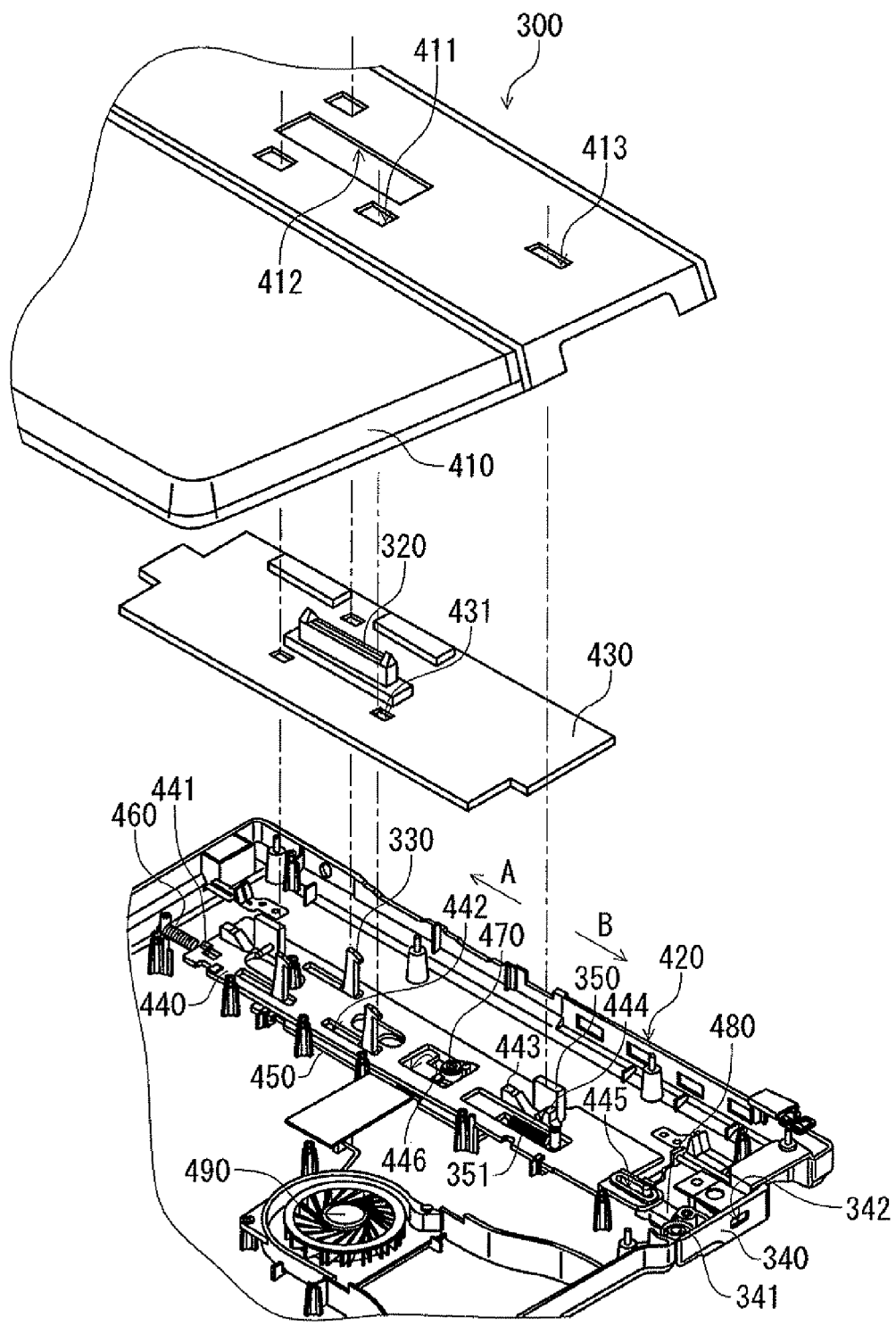
FIG. 10 is an exploded perspective view of the port replicator.

FIG. 10 is an exploded perspective view of the port replicator 300. The port replicator 300 is configured with an upper housing 410 disposed on a lower housing 420. A print circuit board 430 implemented with the connector 320 shown in FIG. 6 is mounted and fixed to the lower housing 420. Hook holes 431, 411 are provided respectively in the print circuit board 430 and the upper housing 410 in the positions corresponding to the locking hooks 330 shown in FIG. 6. The upper housing 410 has a connector hole 412 in the position corresponding to the connector 320. In addition, the upper housing 410 has a push-up hole 413 in the position corresponding to the push-up member 350.

The lower housing 420 accommodates a locking hook member 450, the push-up member 350, a movable member 440, a pulling coil spring 460, a cam member 470, the lever 340, a connecting member 480 and the like. The locking hook member 450 has the locking hooks 330 shown in FIG. 6. The push-up member 350 moves in the up-and-down direction. The movable member 440 guides the movement of the locking hook member 450 and moves in the longitudinal direction (the directions of arrows A, B). The pulling coil spring 460 biases the movable member 440 in the direction away from the lever 340 (the direction of the arrow A). The cam member 470 interlocks with the movable member 440 and causes the locking hook member 450 to move. The lever 340 rotates about the rotational pivot 341. The connecting member 480 connects the lever 340 and the movable member 440. The port replicator 300 also has hard disk units, various circuit boards and the like not shown in FIG. 10. FIG. 10 also shows a fan 490 for dissipating heat generated from those electronic components.

The movable member 440 has a protrusion 441, locking hook rail channels 442, a slope protrusion 443, an interference protrusion 444, a connecting member rail channel 445 and a cam hole 446. The pulling coil spring 460 is attached to the protrusion 441. The locking hooks 330 are fitted into the locking hook rail channels 442. The slope protrusion 443 contacts a protrusion 351 provided in the root of the push-up member 350 and causes the push-up member 350 to move in the up-and-down direction. The interference protrusion 444 contacts the protrusion 351 of the push-up member 350 and restricts the movement of the movable member 440 in the direction away from the lever 340 (the direction of the arrow A). The connecting member 480 is fitted into the connecting member rail channel 445. The cam member 470 is fitted into the cam hole 446.

The pulling coil spring 460 has one end thereof fixed to the lower housing 420 and the other end attached to the protrusion 441 of the movable member 440. The locking hook member 450 has the locking hooks 330 protruding from the locking hook rail channels 442 of the movable member 440. The locking hook member 450 is joined with the movable member 440 by the cam member 470. The lever 340 has the rotational pivot 341 thereof inserted into a spindle (not shown) provided in the lower housing 420. The lever 340 is connected with the movable member 440 by the connecting member 480. When the upper housing 410 is fixed over the lower housing 420 to which the print circuit board 430 is mounted, the connector 320 and the locking hooks 330 protrude from the upper surface of the upper housing 410, as shown in FIG. 6. Simultaneously, the push-up member 350 is accommodated in a push-up hole 413 with its upper end not protruding from the upper surface of the upper housing 410. The lever side hole 342 of the lever 340 communicates with the putting base side hole 301 when being in the locking position (see FIG. 8) as shown in FIG. 8 and FIG. 9.

FIG. 10 shows the port replicator with the lever 340 not rotated. In this state, the movable member 440 is pulled in the direction of the arrow A by the biasing force of the pulling coil spring 460. Thus, the movable member 440 is closer or near to the side remote from the lever 340 (the left side in the figure). At this time, the push-up member 350 is positioned below the slope protrusion 443. Accordingly, as shown in FIG. 6, the push-up member 350 is accommodated in the push-up hole 413 of the upper housing 410. The connector 320 and the locking hooks 330 are protruding from the upper housing 410. Consequently, the locking hooks 330 are hooked and engaged in the holes 12 provided in the bottom surface of the personal computer 10 (see FIG. 7) and the personal computer 10 is locked to the port replicator 300.

Figure 11:
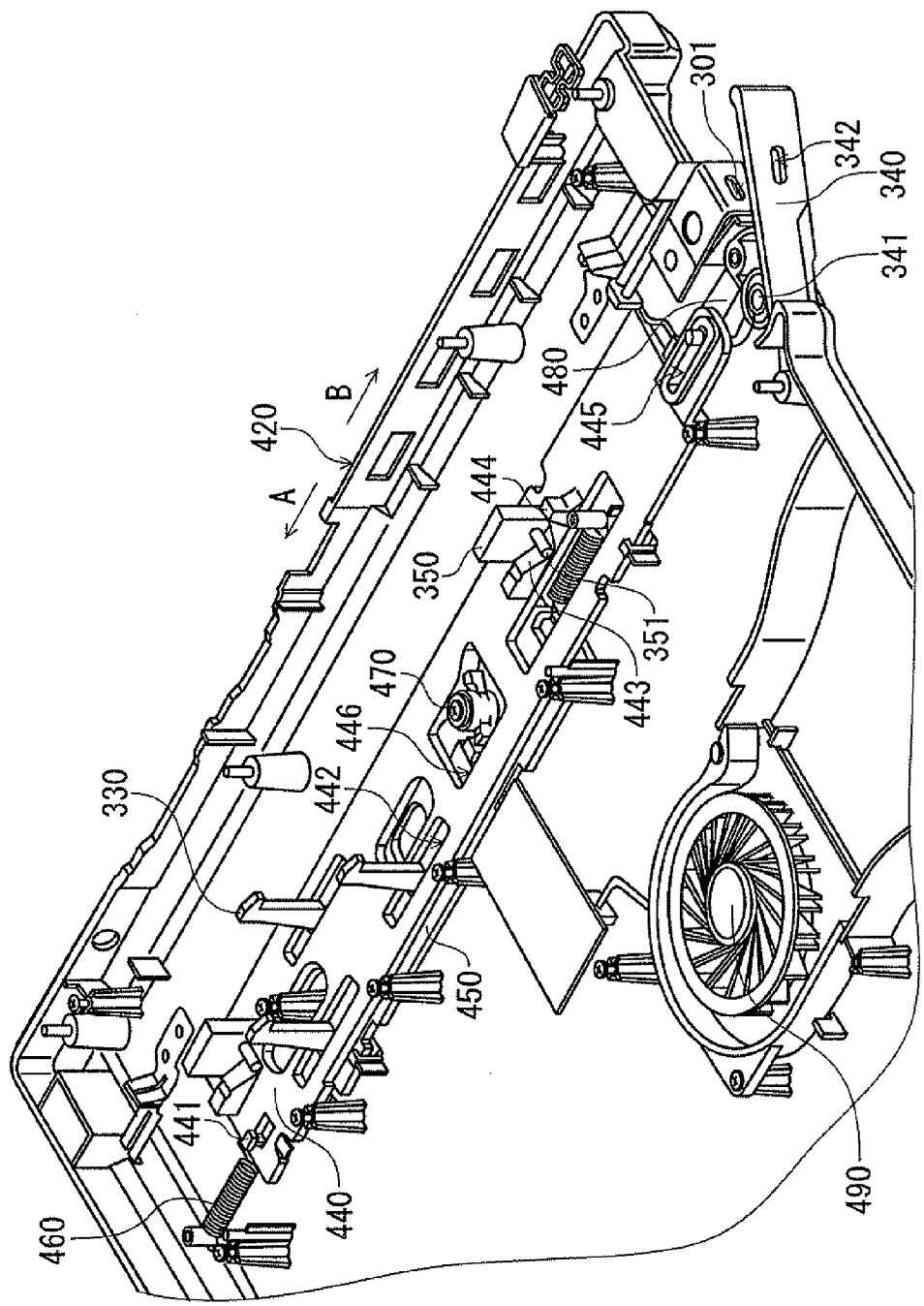
FIG. 11 is a view showing the state of the interior of the port replicator in an intermediate stage of movement of the lever to release the lock.

FIG. 11 is a view showing the state of the interior of the port replicator 300 in an intermediate stage of movement of the lever 340 to release the lock. The user rotates the lever 340 toward the lock-releasing position, for example, in FIG. 11 in direction B away from the putting base 310. As a result, the connecting member 480 joined to the rotational pivot 341 pulls the movable member 440 against the biasing force of the pulling coil spring 460. Therefore, the movable member 440 slides in the direction toward the lever 340 (the direction of the arrow B). At this time, the cam member 470 rotates along the edge of the cam hole 446 of the movable member 440 and causes the locking hook member 450 to move in the direction reverse to that of the movable member 440 (the direction of the arrow A). Consequently, the locking hooks 330 get out of the holes 12 provided in the bottom surface of the personal computer 10 (see FIG. 7) and the locking of the personal computer 10 is released. In addition, in the state shown in FIG. 11, the protrusion 351 of the push-up member 350 is positioned between the slope protrusion 443 and interference protrusion 444 of the movable member 440. That is, in the state shown in FIG. 11, the push-up member 350 is not yet pushed upward.

Figure 12:
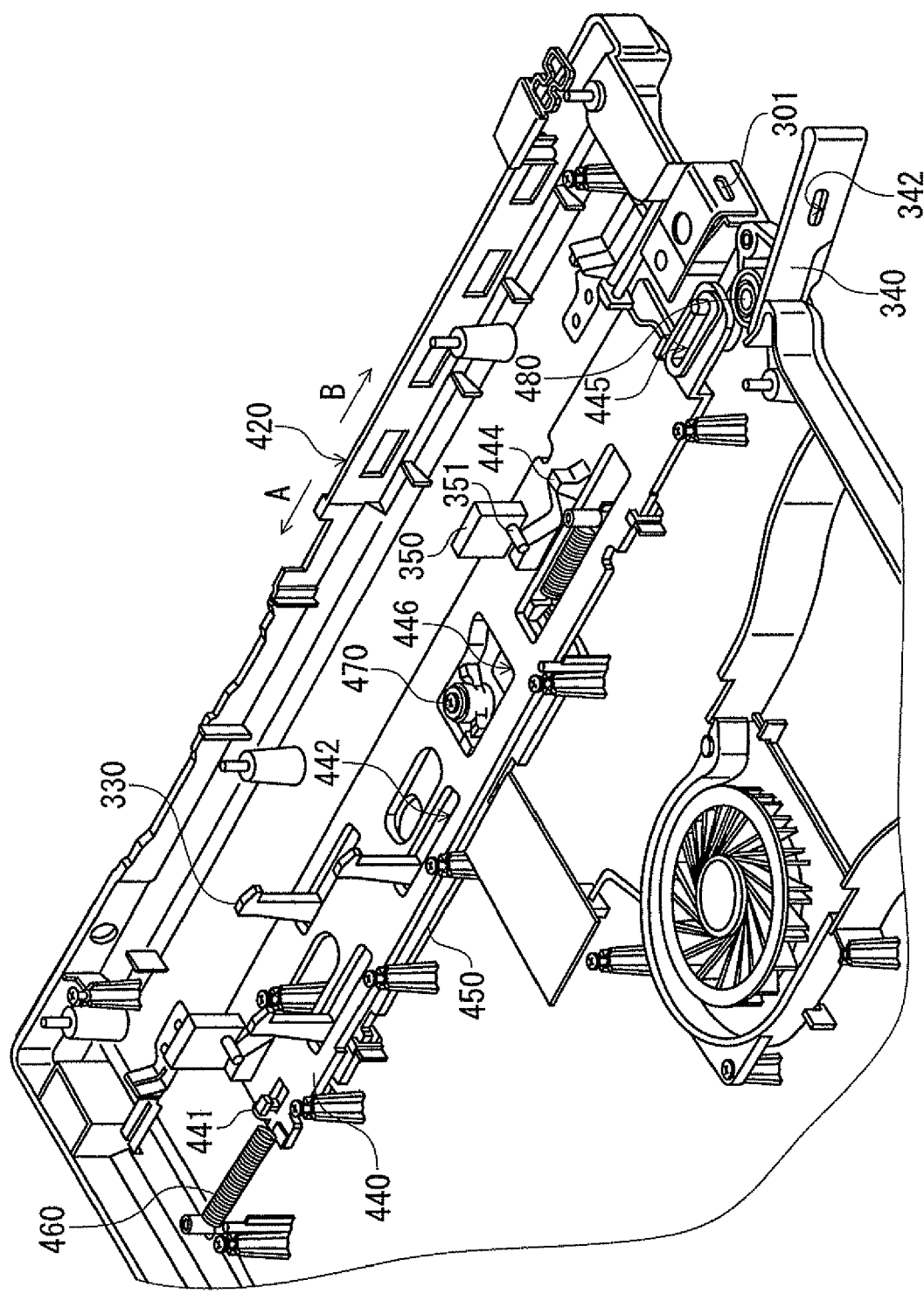
FIG. 12 is a view showing the state of the interior of the port replicator with the lever completely opened.

FIG. 12 is a view showing the state of the interior of the port replicator 300 with the lever 340 completely opened. The user further opens the lever 340 from the state shown in FIG. 11. Thus, the movable member 440 further moves. Therefore, the ends of the locking hook rail channels 442 reach the positions of the locking hooks 330 of the locking hook member 450. Movements of the push-up member 350 in the directions of the arrows A, B are restricted by the push-up hole 413. Because of this, the protrusion 351 of the push-up member 350 is pushed up by the slope protrusion 443 as the movable member 440 moves. As a result, the push-up member 350 protrudes from the push-up hole 413 of the upper housing 410 (see FIG. 10). Consequently, the push-up member 350 pushes up the back surface of the personal computer 10 and the connector 11 of the personal computer 10 is disconnected from the connector 320 of the port replicator 300.

The protrusion 351 of the push-up member 350 fits in a groove provided in the upper surface of the slope protrusion 443. Since the weight of the personal computer 10 is applied downwardly in this state, the movable member 440 does not move even if the user releases the lever 340. Therefore, the personal computer 10 is held being lifted up.

In the present embodiment, in the state in which the personal computer 10 is locked to the port replicator 300 and the lever 340 has been moved to the locking position shown in FIG. 8, the wire cable lock is attached to the lever side hole 342 and the putting base side hole 301 which are intercommunicating.

Figure 13:
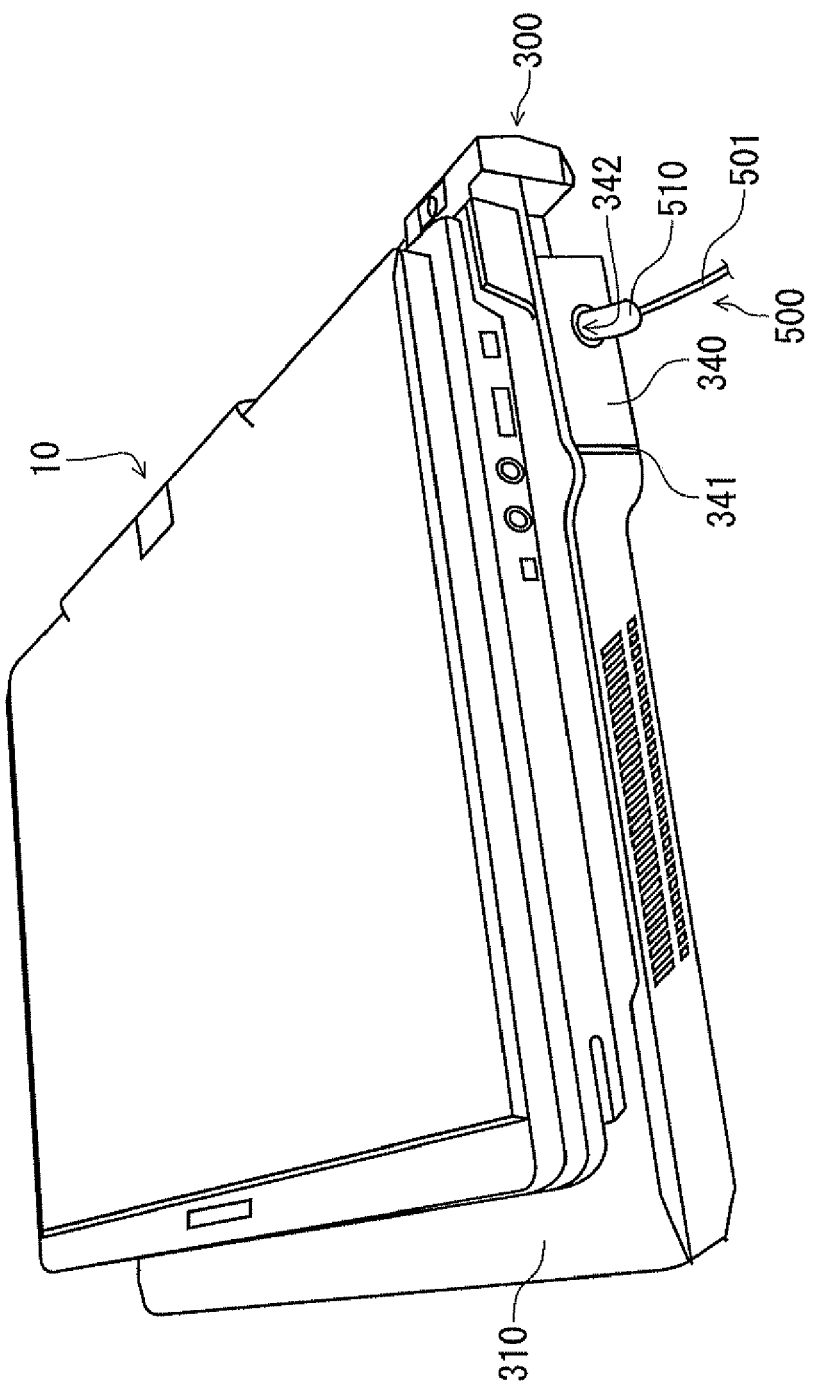
FIG. 13 is a view showing the port replicator to which the wire cable lock is attached.

FIG. 13 is a view showing the state of the wire cable lock being attached. A wire cable lock 500 has a wire 501 and a locking portion 510. The locking portion 510 is provided on the tip end of one end of the wire 501. The locking portion 510 is fixed to the putting base 310 of the port replicator 300 through the lever 340. The other end of the wire 501 is fixed to a desk or the like. When the wire cable lock 500 is attached to the port replicator 300, the lever 340 cannot be moved and therefore the personal computer 10 cannot be removed from the port replicator 300. In this way, the personal computer 10 as well as the port replicator 300 can be prevented from theft.

When operating to remove the personal computer 10 from the port replicator 300, the user cannot forcibly move the lever 340 since the wire cable lock 500 is attached to the lever 340. Therefore, the present embodiment causes the user to surely unlock the wire cable lock 500 before moving the lever 340, which can prevent breakage of the lever 340, the wire cable lock 500 or the like.

Although the above embodiment explains an example in which the electronic device is a personal computer having the tablet mode, it may be a personal computer not equipped with the tablet function. The electronic device may also be an electronic organizer or the like.

Although the above embodiment shows a wire cable lock such as a KENSINGTON lock as an example of a theft prevention tool, the locking member is not limited thereto. The locking member may be any one which has a structure to be accommodated or be engaging by/in the respective holes of the housing and lever of a port replicator for restraining rotation of the lever.

Although the above embodiment explains an example in which a wire cable lock is attached to the port replicator, the locking member is not limited thereto. The locking member may also be of a type which generates an alarm sound upon sensing vibration of the personal computer, for example.

Although the above embodiment explains an example in which a personal computer is removed from a port replicator by a lever, the lock-releasing member is not limited thereto. The lock-releasing member may also be a member which is caused to slide for removing the electronic device from the function expansion device, for example.

According to an aspect of the embodiments of the invention, any combinations of the described features, functions, operations, and/or benefits can be provided.

Although a few preferred embodiments of the present invention have been illustrated and described, it would be appreciated by those skilled in the art that changes may be made in these embodiments without departing from the principles and spirit of the invention, the scope of which is defined in the claims and their equivalents.

What is claimed is:

1. A function expansion device for expanding function of an electronic device attached thereto, comprising:
   a housing containing an electronic component; and
   a lock-releasing lever attached to the housing and movable between a locking position in which the lock-releasing lever contacts the housing and a lock-releasing position to which the lock-releasing lever moves in response to a lock-releasing operation, the lock-releasing lever locks the electronic device so that the electronic device cannot be removed when the lock-releasing lever is in the locking position and unlocks the electronic device in response to an operation of moving the lock-releasing lever from the locking position to the lock-releasing position, wherein
   the housing and the lock-releasing lever have respective holes for aligning with each other when the lock-releasing lever is in the locking position, the aligned holes operate as a security slot to which a locking member for locking the electronic device to the function expansion device for theft prevention is attachable.

2. The function expansion device according to claim 1, wherein
   the lock-releasing lever is pivotally fixed at one end thereof to the housing, is biased toward the locking position and is moved to the lock-releasing position in response to a rotational operation in a direction away from the housing, and
   the hole of the lever is formed in other end side of the lever.

3. The function expansion device according to claim 1, further comprising a locking hook, wherein the locking hook enters into a hole of a housing of the electronic device to engage the electronic device and releases the engagement by movement of the lock-releasing member to the lock-releasing position.

4. The function expansion device according to claim 1, further comprising:
   a connector fitting with a connector of the electronic device, and
   an attachment-releasing member, the attachment-releasing member pushes the electronic device in such a direction as to release the fitting of the connector of the electronic device with the connector of the function expansion device to detach the electronic device in response to the lock-releasing operation of the lock-releasing lever.

5. The function expansion device according to claim 1, further comprising a putting base to which the electronic device is attached by being put thereon.

6. The function expansion device according to claim 1, wherein the function expansion device is attached to the electronic device, the electronic device comprises a display unit having a display screen for displaying information and a main body unit having an information processing circuit and a keyboard on an upper surface thereof, the display unit is connected to the main body unit so as to be openable and closable.

7. The function expansion device according to claim 1, wherein the function expansion device is attached to the electronic device, the electronic device comprises a display unit having a display screen for displaying information and a main body unit having an information processing circuit and a keyboard on an upper surface thereof, the display unit is connected to the main body unit through a biaxial connector member so as to be openable and closable and, in an open state, rotatable.

8. An electronic device system, comprising:
   an electronic device; and
   a function expansion device for expanding a function of the electronic device attached thereto,
   the function expansion device comprises:
      a housing containing an electronic component; and
      a lock-releasing lever attached to the housing and movable between a locking position in which the lock-releasing lever contacts the housing and a lock-releasing position to which the lock-releasing lever moves in response to a lock-releasing operation, the lock-releasing lever locks the electronic device so that the electronic device cannot be removed when the lock-releasing lever is in the locking position and unlocks the electronic device in response to an operation of moving the lock-releasing lever from the locking position to the lock-releasing position, wherein
      the housing and the lock-releasing lever have respective holes for aligning with each other when the lock-releasing lever is in the locking position, the aligned holes operate as a security slot to which a locking member for locking the electronic device to the function expansion device for theft prevention is attachable.

9. The electronic device system according to claim 8, wherein
   the lock-releasing lever is pivotally fixed at one end thereof to the housing, is biased toward the locking position and is moved to the lock-releasing position in response to a rotational operation in a direction away from the housing, and
   the hole of the lever is formed in other end side of the lever.

10. The electronic device system according to claim 8, further comprising a locking hook, wherein the locking hook enters into a hole of a housing of the electronic device to engage the electronic device and releases the engagement by movement of the lock-releasing lever to the lock-releasing position.

11. The electronic device system according to claim 8, wherein
   the electronic device has a connector,
   the function expansion device further has a connector fitting with the connector of the electronic device and an attachment-releasing member, the attachment-releasing member pushes the attached electronic device in such a direction as to release the fitting of the connector of the electronic device with the connector of the function expansion device to detach the electronic device in response to the lock-releasing operation of the lock-releasing lever.

12. The electronic device system according to claim 8, wherein the function expansion device has a putting base to which the electronic device is attached by being put thereon.

13. The electronic device system according to claim 8, wherein the electronic device comprises:
   a display unit having a display screen for displaying information, and a main body unit comprising an information processing circuit and a keyboard on an upper surface thereof, the display unit is connected to the main body unit and openable and closable.

14. The electronic device system according to claim 8, wherein the electronic device comprises:

a display unit having a display screen for displaying information, and a main body unit comprising an information processing circuit and a keyboard on an upper surface thereof, the display unit is connected to the main body unit through a biaxial connector member and openable and closable and, in an open state, rotatable.

15. A function expansion device expanding function of an electronic device attached thereto, comprising:

a housing supporting the electronic device mounted thereon; and a lock-releasing lever movable between a locking position and a lock-releasing position in response to a lock-releasing operation, the lock-releasing lever locks the electronic device to the housing when the lock-releasing lever is in the locking position and unlocks the electronic device in response to moving the lock-releasing lever to the lock-releasing position, wherein the housing and the lock-releasing lever have respective holes for aligning with each other when the lock-releasing lever is in the locking position and for receiving in the aligned holes a locking member locking the expansion device and preventing dismounting of the electronic device.

16. The function expansion device according to claim 15, wherein the lock-releasing lever is pivotally fixed at one end thereof to the housing, is biased toward the locking position and is moved to the lock-releasing position in response to the lock-releasing operation including a rotational operation in a direction away from the housing, and the hole of the lever is formed in other end side of the lever.

17. The function expansion device according to claim 15, further comprising a locking hook entering into a hole of a housing of the electronic device and engaging the electronic device in the locking position and releasing the engagement in response to moving the lock-releasing lever to the lock-releasing position by the lock-releasing operation.

18. The function expansion device according to claim 15, wherein the locking member generates an alarm sound upon sensing vibration of the electronic device.

* * * * *

UNITED STATES PATENT AND TRADEMARK OFFICE
CERTIFICATE OF CORRECTION

PATENT NO.         : 7,859,833 B2                                      Page 1 of 1
APPLICATION NO.    : 12/175052
DATED              : December 28, 2010
INVENTOR(S)        : Kaigo Tanaka It is certified that error appears in the above-identified patent and that said Letters Patent is hereby corrected as shown below:

Column 11, Lines 5-12 delete
"14. The electronic device system according to claim 8, wherein the electronic device comprises:
 a display unit having a display screen for displaying information, and a main body unit comprising an information processing circuit and a keyboard on an upper surface thereof, the display unit is connected to the main body unit through a biaxial connector member and openable and closable and, in an open state, rotatable."

and insert with correct indentations

-- 14. The electronic device system according to claim 8, wherein the electronic device comprises:
 a display unit having a display screen for displaying information, and
 a main body unit comprising an information processing circuit and a keyboard on an upper surface thereof, the display unit is connected to the main body unit through a biaxial connector member and openable and closable and, in an open state, rotatable. --, therefor.

Signed and Sealed this
Twelfth Day of April, 2011

David J. Kappos
*Director of the United States Patent and Trademark Office*